United States Patent

Schmidt et al.

[11] Patent Number: 6,040,660
[45] Date of Patent: Mar. 21, 2000

[54] DEVICE FOR CONTROLLING THE INTENSITY OF THE LIGHT EMITTED BY A LIGHTING ELEMENT OF A LIGHTING APPARATUS, IN PARTICULAR A FLASHLIGHT

[76] Inventors: Rudolf Schmidt, Dr. Balthasar-Hubmeier-Str. 14 86316, Friedberg-West; Augustin Thalhofer, Keltenstr. 16 86863, Langenneufnach-Unterrothern, both of Germany

[21] Appl. No.: 08/876,021

[22] Filed: Jun. 13, 1997

[30] Foreign Application Priority Data

Jul. 9, 1996 [DE] Germany ............... 196 27 607

[51] Int. Cl.[7] .................................................. H05B 37/02
[52] U.S. Cl. ................ 315/200 A; 315/136; 315/291; 315/DIG. 4
[58] Field of Search ................. 315/200 A, 136, 315/240, 241 P, 241 S, 291, 307, 308, DIG. 4, 129, 170, 76, 363

[56] References Cited

U.S. PATENT DOCUMENTS 5,248,919  9/1993  Hanna et al. .................... 315/291
5,585,698  12/1996  Langhans et al. ............... 315/200 A

*Primary Examiner*—David H. Vu
*Attorney, Agent, or Firm*—Jones, Tullar & Cooper, P.C.

[57] ABSTRACT

A device for controlling the intensity of the light emitted by a lighting element of a lighting apparatus, in particular a flashlight, is embodied as a module which can be arranged in series with the lighting element for the supply of the latter with current. A circuit device for controlling the light-intensity of the lighting element, and a central control device for detecting a detection signal of the detection device as well as for triggering the circuit device are provided. It is made possible with the present invention to dim the intensity of the light emitted by it by variation, in particular in several stages.

18 Claims, 3 Drawing Sheets

DEVICE FOR CONTROLLING THE INTENSITY OF THE LIGHT EMITTED BY A LIGHTING ELEMENT OF A LIGHTING APPARATUS, IN PARTICULAR A FLASHLIGHT

FIELD OF THE INVENTION

The present invention relates to a device for controlling the intensity of the light emitted by a lighting element of a lighting apparatus, in particular a flashlight.

BACKGROUND OF THE INVENTION

After being switched on, flashlights as a rule operate at full light intensity, although in many individual cases a reduced light intensity would also be sufficient. The service life of the batteries and of the lighting element, i.e. the flashlight bulb or bulbs, is reduced by the constant use at maximum intensity. At the end of their service life they need to be disposed of or, in the case of rechargeable batteries, freshly charged from the power net. The maximum length of operation independently of the power net is limited by this.

SUMMARY OF THE INVENTION

Based on the foregoing, it is an object of the present invention to be able to vary the intensity of the light emitted by a lighting element of a lighting apparatus, in particular of a flashlight, by means of a cost-effective and as simple as possible apparatus, which can also be retrofitted.

The device in accordance with the present invention, which is embodied as a module, operates without its own current supply, since it also uses the current supply of the light apparatus, in particular of the flashlight. As a module it can moreover be attached very simply, and in the case of a flashlight even without any structural changes of the flashlight. Although the various dimming stages, i.e. intensities of the light emitted by the lighting element, are switched by a switching mechanism in the device, no key, switch or other switching element of its own is required for changing the intensity stages, since a control pulse triggered by a light switch element of the lighting apparatus is detected by a detection element in the device and, when this control pulse has been detected by the detection element, the latter causes the central control device by means of a detection signal to trigger the switching mechanism for triggering the intensity of the lighting element.

It is advantageous if the switching mechanism for controlling the light intensity has a series-connected switching stage, which can be triggered by the central control device. This permits an almost loss-free control of the light intensity. In this case the component can be a simple switching transistor.

In accordance with an embodiment of the present invention, the pulse width of the output current or the initial voltage of the switching stage can be triggered as a function of control signals from the central control device. This permits the regulation of the intensity while maintaining a fixed output frequency.

In a useful manner the control pulse, which can be detected by the detection device, is an interruption of the supply current of the lighting element by means of a switching mechanism in the form of a flashlight key or flashlight switch and with a time interval of less than one switch-over time interval from the last control pulse. In this way it is possible, as a function of the time distance from the last actuation, to trigger either a change of the light intensity of the lighting element or instead to use the light switch element only for switching on or off.

When a control pulse is detected by the detection device, the light intensity of the lighting element can preferably be varied in several stages in the switching mechanism by means of the output of a switching signal from the central control device to the switching mechanism. This makes possible a simple and reproducible change of the light intensity by means of switching in predeterminable stages.

Furthermore, when switching the lighting device on after a defined time, which is longer than the switch-over time interval, the basic light intensity, preferably the maximum light intensity of the lighting element, can be switched on by means of the switching apparatus. It is of importance that the maximum light intensity is always assured when switching on, in particular in a public safety area, such as for the police.

It is useful that the light intensity of the lighting element is reduced by one step by the switching apparatus when actuating the light switch element, in particular a flashlight key or flashlight switch, within a time interval after the previous actuation which is less than the switch-over time interval. In this connection it is useful if the first stage has 50% and the second stage 25% of the maximum light intensity, since this results in very useful dimming stages. When actuating the light switch element within a time interval which is less than the switch-over time interval, the light intensity, if it was set to the lowest stage, is switched to maximum light intensity in order to make possible cyclical switching of the predetermined stages of light intensity in this way.

It has been shown to be practical if the switch-over time interval is one second.

The central control device can be simply and cost-effectively designed as a microprocessor. If the circuit is constructed in SMD (surface-mounted device) technology or as a hybrid circuit, it is very cheap to produce and can in particular be extensively miniaturized. Because of this the device can later be inserted into any lighting apparatus, in particular a flashlight, and requires little space. To this end it can be designed particularly as a very flat cylinder of a diameter of the batteries used in a flashlight, and can be inserted like a coin or tablet behind these batteries.

A buffer, which provides a stable voltage supply, is usefully provided for the voltage supply of the circuit. In the process the buffer, which can be triggered by the central control device, is usefully recharged by the current supply of the lighting element during the phases of the pulse-width modulation when the lighting element is activated, in which the triggerable switching stage does not emit any output current. This then results in a chronological division of the current from the current supply, for example the batteries of a flashlight, into a charge of the buffer and current for the lighting element. In this case, to assure a stable current supply of the electronic circuit of the device, output current can be delivered by the switching stage during a pulse width of approximately 97%, and the buffer can be recharged during the remaining time.

It is furthermore useful to provide a voltage regulator for the provision of a constant supply voltage, preferably 5 Volts, for the component of the device. For example, with a voltage of 2 Volts it is possible with such a voltage regulator to achieve a supply voltage of 5 Volts for the device.

It is furthermore advantageous if the electronic components of the circuit are embedded, preferably in a resin, which results in particular in protection against mechanical blows and the effects of moisture. The circumference of the device usefully should not exceed the circumference of a flashlight battery for the flashlight into which the device will be inserted, so that the device can be simply inserted.

If furthermore the device has a housing, it is protected against external influences. In this case it is useful if the front faces of the housing are or have voltage supply connections for the circuit of the device in order to allow a simple voltage supply of the electronic components of the device by simply inserting it behind a flashlight battery. In this connection a battery reversal protection is useful in order to prevent the destruction of the components, wherein preferably a two-way diode connection is provided which, independence of orientation assures dependable current supply.

Further characteristics and advantages of the present invention ensue from the description of an exemplary embodiment by means of the drawings.

DESCRIPTION OF THE PREFERRED EMBODIMENTS

Figure 1:
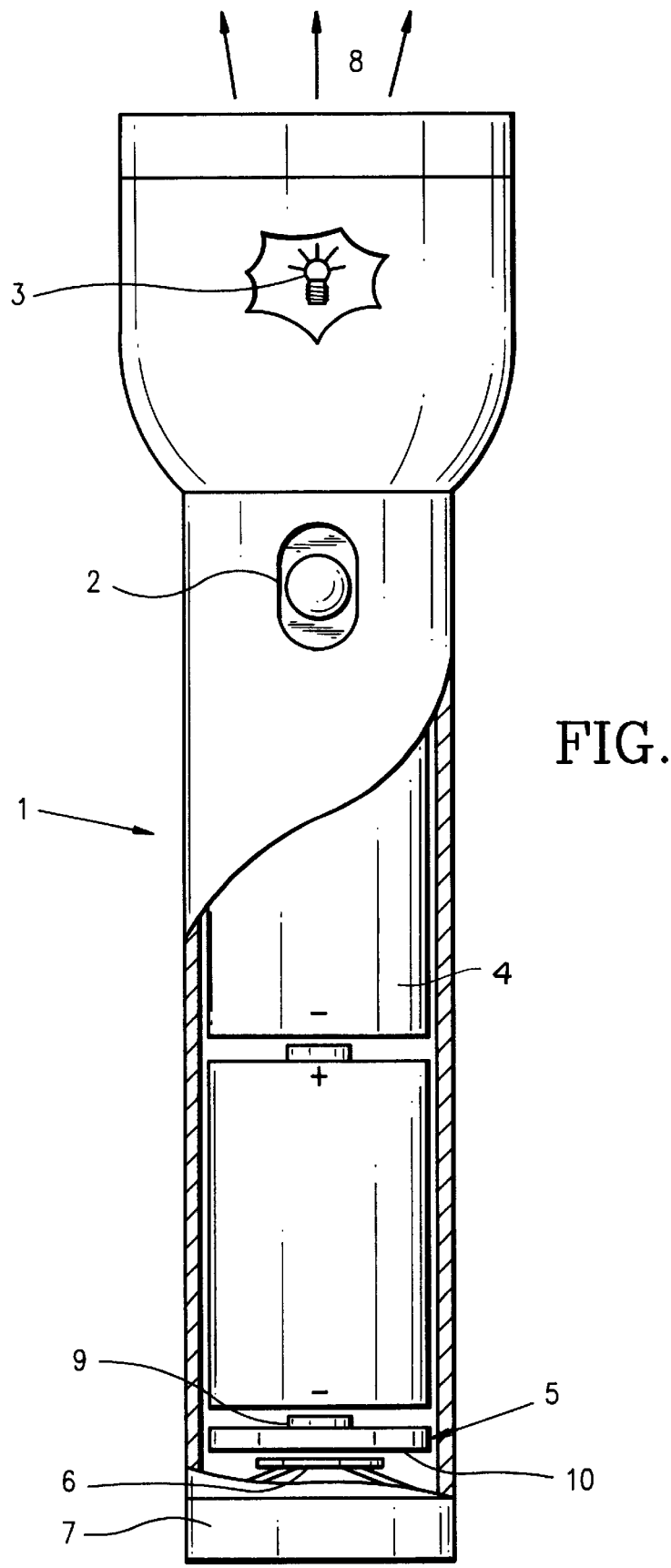
FIG. 1 is a lateral view in partial section of a lighting apparatus in the form of a flashlight with a device in accordance with the present invention inserted therein.

FIG. 1 shows a lighting apparatus partially in section in the form of a flashlight with a light switch element 2, here embodied as a combined on-off switch or key, and with a lighting element 3 in the form of an incandescent bulb. Either disposable batteries or rechargeable batteries are provided as the current supply 4. The device for dimming the light intensity, is embodied in accordance with the present invention as a module 5, which has been inserted between a battery 4 and a contact spring 6 at the closure cap 7 of the flashlight.

The module 5 permits the variation of the intensity of the light emitted by the lighting element 3, here only comprising an incandescent bulb, by actuating the light switch element 2. In a flashlight, the light switch element 2 is provided for switching the lighting element on and off or for keying it, and in accordance with the present invention it can furthermore also be provided for varying the intensity of the light emitted by the lighting element 3.

Figure 2:
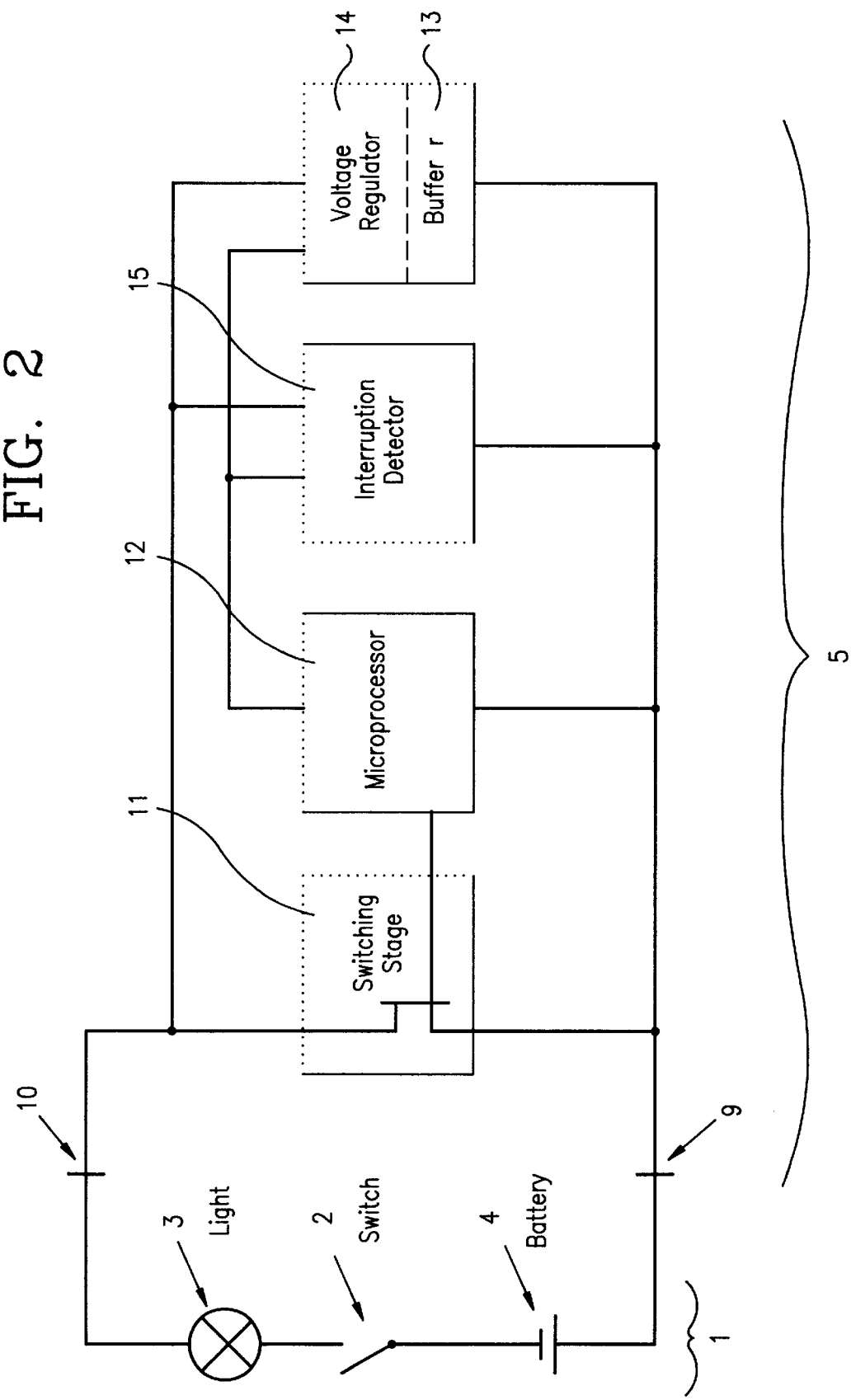
FIG. 2 is a block diagram of a device in accordance with the present invention inserted in a flashlight.

The function of the circuit will be explained by means of the block diagram in FIG. 2. A lighting element 3 in the form of one light or alternatively several lights, a light switch element 2 in the form of a key, and a current supply in the form of one or alternatively several batteries 4, etc., are represented in the left area of FIG. 2. In this case the sequence of the serially arranged elements of the flashlight can vary. Components of the module 5 in accordance with the present invention are represented to the right of the elements 2, 3, 4 of the flashlight. In this case the module 5 in accordance with the present invention comprises two connections 9, 10 represented in FIG. 1, wherein the connection 9 in FIG. 1 rests against a pole of the battery 4, and the connection 10 against a contact spring 6, connected with a lighting element 3 or a switch 2, or against the pole of a battery. When first switching on the flashlight 1 after prolonged non-use by means of the switch or key 2, the light 3 shines with its basic light intensity, as a rule with its maximum light intensity. Now, if following the switch-on of the flashlight 1, the flashlight is again briefly switched off by means of the switch or key 2 within a predetermined switch-over time interval t, preset by the circuit, and the current supply of the light 3 is interrupted, the intensity of the light emitted by the flashlight is reduced by the module 5. But if in contrast thereto the flashlight is switched off after a time interval t following the last actuation of the switch or key 2 and is switched on again, it again shines with basic light intensity, for example maximum light intensity. In this connection it is possible to determine the time difference between two actuations of the switch 2 in very different ways, namely as a time interval between the previous switch-on of the light and the instantaneous switch-off, as a time difference between the previous switch-on and the instantaneous switch-on, or as a time difference between the last switch-off and the new switch-on, or as time difference between the last switch-off and the instantaneous switch-off. Here, the time interval between the last switch-on and the start of the renewed, brief switch-off is considered. A second is used here as the switch-over time interval t, i.e. a maximum time interval between two actuations of the switch 2, where within this time interval a change of the light intensity takes place by means of the module 5, and where outside of this time interval there is no change in the intensity of the light, since as a rule it can be determined within one second whether the light intensity should be reduced.

If the module 5 is to reduce the light intensity because of a renewed activation within the switch-over time t, it is reduced in stages. Alternatively it would also be conceivable to provide the reduction in light intensity continuously by means of the switch 2 within the switch-over time interval after actuation of the switch or the key 2, for example as a function of the length of the interruption of the current supply to the light.

Here, the change in light intensity is performed-in three stages. When first switched on, the light 3 shines at maximum intensity, with the first reduction by means of actuating the switch or key 2 within the switch-over time interval since the last actuation, the light intensity of the light 3 is reduced by 50%. With the second brief interruption of the current supply of the light 3 by means of the switch 2, the light intensity is again reduced by 50%, i.e. now to 25% of the maximum light intensity. With further actuation of the switch 2 for the brief interruption of the current supply of the light 3 within the switch-over time interval since the last disruption by the switch 2, the light intensity of the light 3 is again raised to the maximum intensity.

A circuit device 11 (switching stage) is provided in the module 5 for reduction of the light intensity of the light 3 with respect to the maximum basic light intensity. Here, the circuit device 11 operates with almost no energy loss, i.e., as an almost loss-free dimmer. To this end it has a serially-connected switching stage, which can be triggered by the central control device 12. To achieve the maximum light intensity of the light 3, pulses are emitted by a current inverter in the circuit device 11 at a pulse-width repetition rate of 97%, i.e. a pulse width of 97%. During the remaining 3% of the time, the voltage of the current supply 4 is used to recharge the buffer 13. The electronic components of the module are supplied by the buffer 13 with voltage during the entire time, i.e., also during the time in which the voltage of the battery 4 is passed on via the switching stage of the circuit device 11. In this case a voltage regulator 14 has been provided in addition to the buffer, which constantly provides the voltage of, for example, 5 Volts required for the electronic components of the module 5, for which a voltage of the current supply 4 of less than 5 Volts is also sufficient.

The interruption detector 15 is provided for the detection of an interruption of the voltage by a brief switch-off by the switch 2, which sends a detection signal to a central control device 12 embodied as a microprocessor, in case of an interruption of the supply current for the lighting element 3 by the switching device 2.

The microprocessor 12 controls the circuit device 11, and the buffer 13, as well as controlling the evaluation of an interruption detection signal from the interruption detector 15. By means of the microprocessor 12 it is also determined here whether the time interval between the last switch-on and the instantaneous interruption of the voltage supply of the light 3, reported by the interruption detector is, is less than the preset switch-over time interval and, if this is the case, it is decided by it that the amount of dimming by the circuit device 11 is to be changed by one step and in this case changes the triggering of the switching step in the circuit device 11, i.e. the pulse-width repetition rate of the pulse width modulation.

Figure 3:
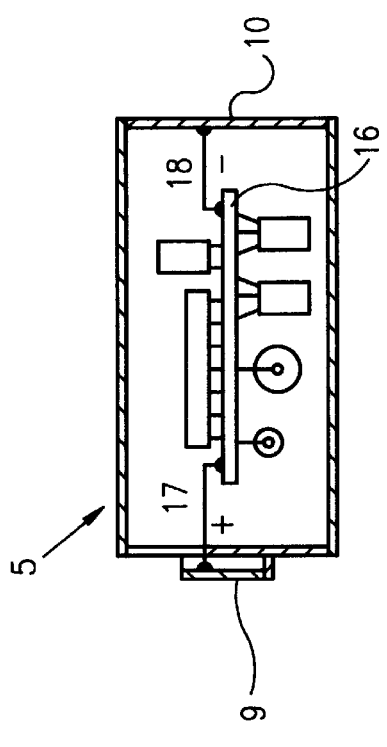
FIG. 3 represents the structure of a device in accordance with the present invention with conventional electronic components.
Figure 4:
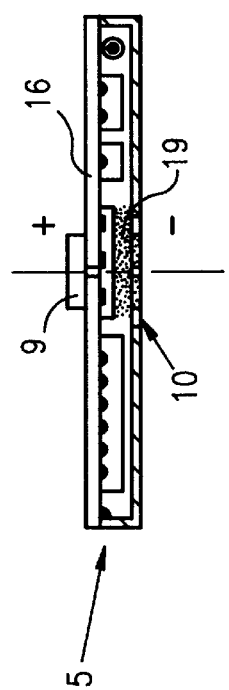
FIG. 4 is a cross section of a device in accordance with the present invention constructed in accordance with SMD-hybrid technology.

Some structural examples of the module in accordance with the invention ensue from FIGS. 3 and 4. FIG. 3 shows in a sectional view the structure of a module in accordance with the present invention with conventional components. In this case the module 5 has the shape of a flashlight battery suitable for the respective flashlight. The voltage supply for the electronic components in the interior of the module 5 is provided here via the two poles 9, 10 at the front faces of the housing of the module 5. In this case the electronic components are arranged on a board 16, preferably soldered on, to which the connecting lines 17, 18 to the two poles 9, 10 are connected.

An embodiment of the module 5 in a flat style in accordance with FIG. 4 is particularly advantageous. The same as in FIG. 3, the housing of the device represented in FIG. 4 has a cylindrical shape, wherein here, too, the circumference usefully corresponds to the circumference of a battery suitable for the respective flashlight, for example R 14, R 10, R 6 of the flat battery, etc. The housing which is also provided here offers a mechanical protection and possibly protection against moisture and leaking of the batteries for the electronic components. As in FIG. 3, the voltage supply of the electronic components here also takes place by means of poles 9, 10 at the front faces of the module 5. The poles can be embodied in the same way as the poles of a flashlight battery in order to assure a dependable contact. In this case the connection of the poles to the electronic components can take place in that the pole 10 encloses a conducting front face and is conductingly extended on the cylinder exterior of the module 5 as far as the printed circuit board 16 and is conductingly connected with this printed circuit board at one point, from where a strip conductor continues. The connection of the other pole 9 can take place, for example, at the passage through the printed circuit board 16 and by a connection with a strip conductor, for example on the inside of the printed circuit board 16.

The electronic components are constructed by means of SMD (surface-mounted devices) or hybrid techniques. A very extensive miniaturization along with a cost-effective design can be realized by means of this. Here, the components are embedded in a sealing compound 19, for example a resin, which constitutes additional protection against mechanical effects, moisture or leaking batteries. With all embodiments there is protection of the electronic components by the housing of the module 5 wherein, in the example represented in FIG. 4, the housing comprises on one front face the printed circuit board 16 which here supports the electronic components and strip conductor on the inside, and on the circumference and the other front face a cap, which at the same time forms a pole 10 at the front face.

A very flat device constructed in accordance with FIG. 4 can be inserted into a flashlight without the removal of batteries by placement behind the rearmost battery while slightly compressing the contact spring of the closure of the flashlight when screwing the closure on the flashlight. All embodiments represented have the advantage that the flashlight need not be altered in any way for the later insertion of the device.

The exemplary embodiments relate to the particularly preferred use in flashlights. However, the devices in accordance with the present invention can also be employed in other lighting apparatus. The principle of changing/dimming a current, which is very advantageous for the present invention, is of importance not only for the lighting apparatus, but can also be used independently thereof on its own for various other application purposes, is performed by means of pulse width modulation or pulse frequency modulation in the module by a circuit element located outside the module in an arrangement, wherein the voltage supply of the module is provided from the voltage of the installation via a buffer.

We claim:

1. A device for controlling the intensity of the light emitted by a lighting element of a lighting apparatus, in particular a flashlight, the lighting apparatus including a light switch element, comprising:

a module arranged in series with the lighting element for controlling the supply of current to the lighting element, said module having a detection device for detecting a control pulse triggered at the light switch element of the lighting apparatus;

a circuit device for controlling the light intensity of the lighting element; and a central control device for detecting a detection signal of the detection device as well as for triggering said circuit device, wherein the control pulse, detected by said detection device, is an interruption of the supply current of the lighting element generated by means of the light switch element, at a time distance from the last control pulse of less than a preselected switch-over time interval, and wherein the light intensity of the lighting element is controlled in stages, and is reduced one stage by said circuit device when actuating the light switch element, within a time interval following prior actuation which is less than the switch-over time interval.

2. The device in accordance with claim 1, wherein said circuit device for controlling the light intensity comprises a switching stage, in particular a transistor, which can be triggered by said central control device.

3. The device in accordance with claim 1, wherein when the control pulse is detected by said detection device, the light intensity of the light element is varied in several stages by means of said circuit device by switching signals of said central control device to said circuit device.

4. The device in accordance with claim 1, wherein the maximum light intensity of the lighting element can be switched on by said circuit device after the lighting apparatus is switched on following a period of non-use, said period of non-use being longer than a switch-over time interval.

5. The device in accordance with claim 1, wherein said stages comprise a first stage and a second stage, and wherein said first stage is 50% and said second stage is 25% of the maximum light intensity.

6. The device in accordance with claim 1, wherein when the light intensity has been set to the weakest stage, it can be switched to the maximum light intensity by said circuit device when the light switch element is actuated within a time interval following a previous actuation which is less than the switch-over time interval.

7. The device in accordance with claim 1, wherein the switch-over time interval is one second.

8. The device in accordance with claim 1, wherein said central control device is a microprocessor.

9. The device in accordance with claim 1, wherein said circuit device is constructed by means of SMD (surface-mounted device) techniques.

10. The device in accordance with claim 1, wherein said module is constructed as a hybrid circuit.

11. The device in accordance with claim 1, further comprising a buffer provided for supplying voltage to said circuit device.

12. The device in accordance with claim 11, wherein when the lighting element is activated, said buffer, which can be triggered by said central control device, is charged in those phases of the pulse width modulation of the current supply of the lighting element, in which the triggerable switching stage does not switch any output current to the lighting element.

13. The device in accordance with claim 11, wherein a switching stage outlet current can be supplied during a pulse width of approximately 97%, and said buffer can be recharged during the remaining time.

14. The device in accordance with claim 11, further comprising: a voltage regulator for supplying a constant voltage.

15. The device in accordance with claim 1, wherein electronic components of said circuit device are embedded, in resin.

16. The device in accordance with claim 1, wherein the circumference of the device does not exceed the circumference of a flashlight battery suitable for the lighting apparatus.

17. The device in accordance with claim 1, further comprising a housing.

18. The device in accordance with claim 17, wherein the front faces of the housing are or have voltage supply connections for electrical circuit of the device.

* * * * *

UNITED STATES PATENT AND TRADEMARK OFFICE
CERTIFICATE OF CORRECTION

PATENT NO. : 6,040,660
DATED : March 21, 2000
INVENTOR(S) : Rudolf Schmidt et al It is certified that error appears in the above-indentified patent and that said Letters Patent is hereby corrected as shown below:

Title page, item [75], the address of the second inventor should be --Keltenstr. 16, 86863, Langenneufnach-Unterrothan--.

Signed and Sealed this

Twenty-second Day of May, 2001

*Attest:*

NICHOLAS P. GODICI

*Attesting Officer*   *Acting Director of the United States Patent and Trademark Office*